United States Patent
Patchornik et al.

(10) Patent No.: US 6,713,974 B2
(45) Date of Patent: Mar. 30, 2004

(54) LAMP TRANSFORMER FOR USE WITH AN ELECTRONIC DIMMER AND METHOD FOR USE THEREOF FOR REDUCING ACOUSTIC NOISE

(75) Inventors: Joshua Patchornik, Ramat Gan (IL); Shaul Barak, Ramat Gan (IL)

(73) Assignee: Lightech Electronic Industries Ltd., Lod (IL)

( * ) Notice: Subject to any disclaimer, the term of this patent is extended or adjusted under 35 U.S.C. 154(b) by 0 days.

(21) Appl. No.: 10/277,683

(22) Filed: Oct. 23, 2002

(65) Prior Publication Data

US 2003/0127994 A1 Jul. 10, 2003

(51) Int. Cl.[7] .................................................. G05F 1/00
(52) U.S. Cl. ........................ 315/295; 315/291; 323/247; 323/226; 323/270; 323/271
(58) Field of Search ................... 315/295, 291, 315/315, DIG. 4; 323/215, 226, 245–247, 270, 271, 273, 275, 282, 285, 303; 363/21.1, 21.18

(56) References Cited

U.S. PATENT DOCUMENTS

| | | | |
|---|---|---|---|
| 4,962,344 A | * | 10/1990 | Bohrer ........................ 327/134 |
| 5,004,969 A | * | 4/1991 | Schanin ...................... 323/235 |
| 5,319,301 A | * | 6/1994 | Callahan et al. ............ 323/235 |
| 6,010,310 A | * | 1/2000 | MacBeth .................... 417/44.1 |
| 6,031,749 A | * | 2/2000 | Covington et al. ........... 363/98 |

FOREIGN PATENT DOCUMENTS

| | | |
|---|---|---|
| DE | 197 31 700 A1 | 1/1999 |
| JP | 06089784 A * | 3/1994 |
| WO | WO 91/06047 | 5/1991 |

* cited by examiner

Primary Examiner—Haissa Philogene
(74) Attorney, Agent, or Firm—Browdy and Neimark

(57) ABSTRACT

A controller for reducing acoustic noise produced during use of a leading edge dimmer, includes a leading edge controller responsive to an input voltage fed thereto for producing a control signal upon detection of a leading edge, and a linear switch coupled to the leading edge controller and responsive to the control signal for linearly switching the input voltage so that a rate of rise of the leading edge is decreased. A trailing-edge controller may be coupled to a leading-trailing edge detector and responsive to detection of a trailing edge dimmer for disabling the leading edge controller and decreasing a rate of decline of the trailing edge of the input voltage.

20 Claims, 6 Drawing Sheets

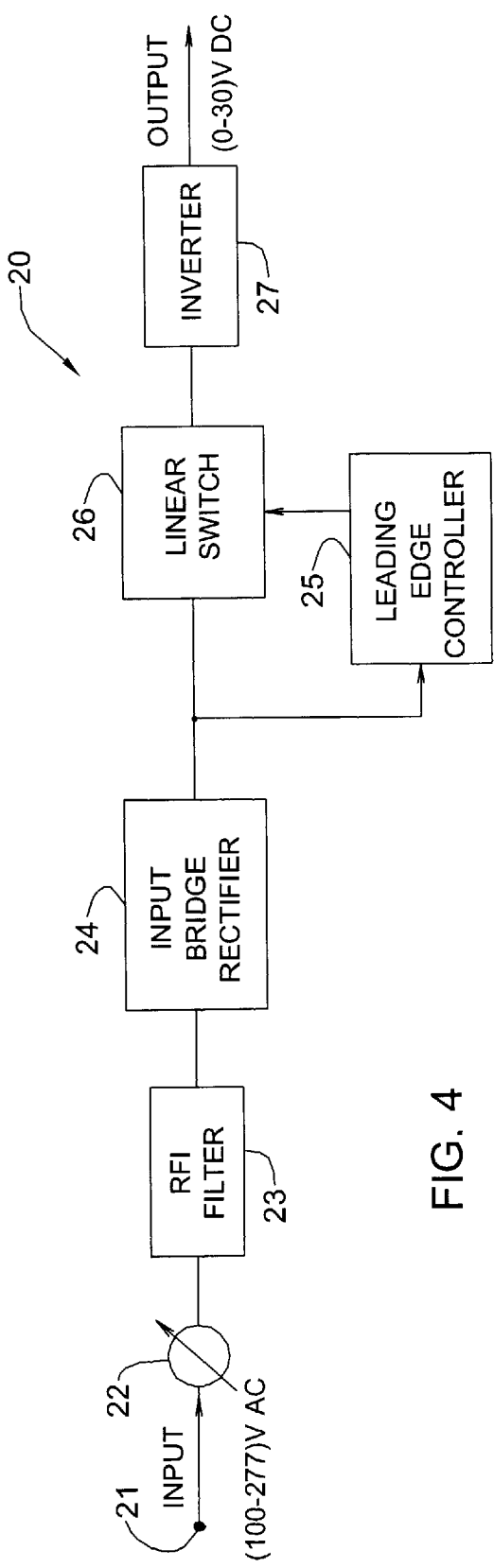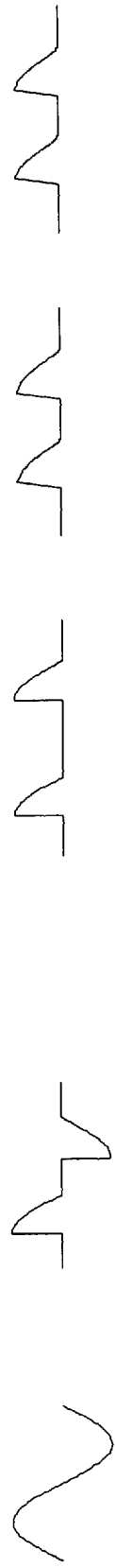
FIG. 4
FIG. 5A  FIG. 5B  FIG. 5C  FIG. 5D  FIG. 5E

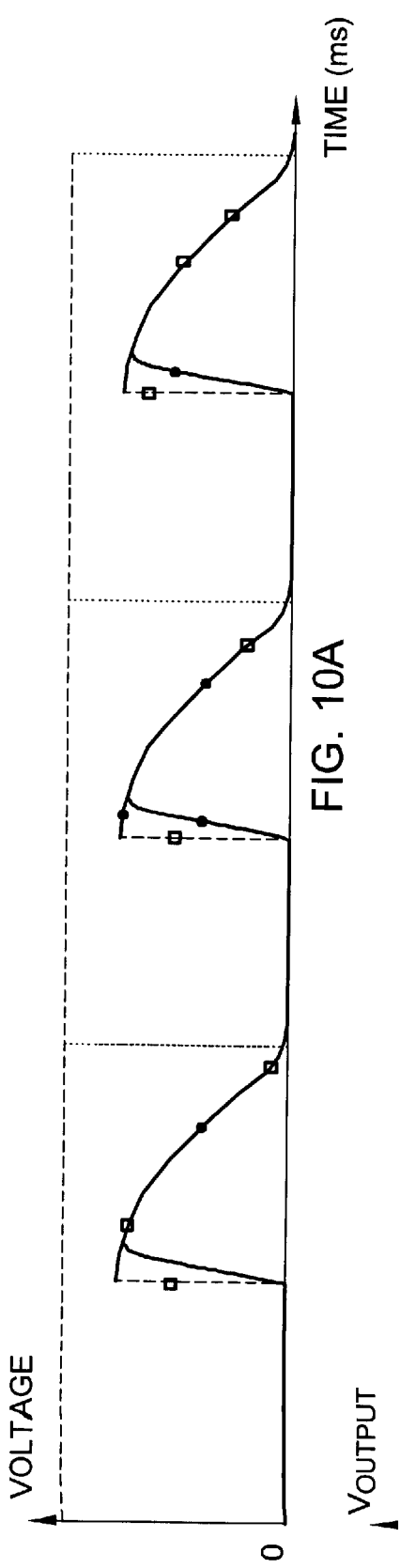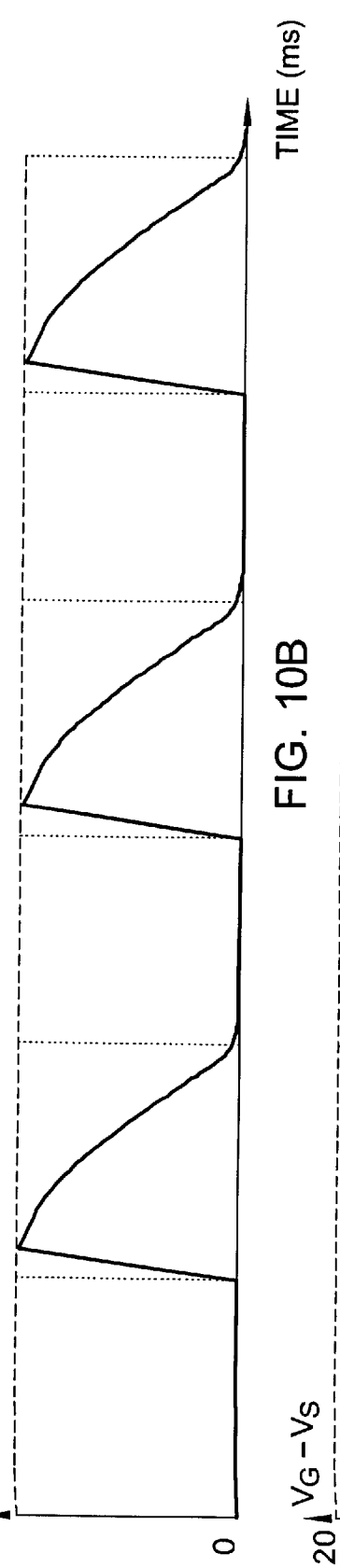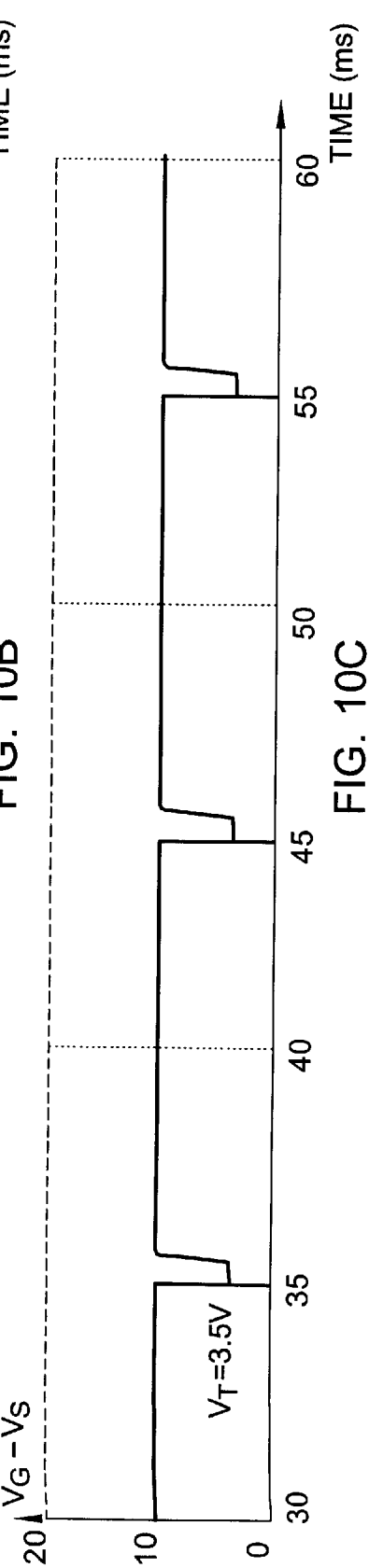

LAMP TRANSFORMER FOR USE WITH AN ELECTRONIC DIMMER AND METHOD FOR USE THEREOF FOR REDUCING ACOUSTIC NOISE

FIELD OF THE INVENTION

This invention relates to noise detection and reduction when electronic converters/transformers or magnetic transformers are used together with lamp dimmers.

BACKGROUND OF THE INVENTION

As is known lamp dimers reduce the power fed to a lamp by reducing the average voltage applied to the lamp. To this end, two types of dimmer are known: leading edge dimmers that switch the voltage on after the zero crossing point in the AC cycle; and trailing edge dimmers that switch the voltage off before the zero crossing point in the AC cycle. Typically, lamp dimmers employ very fast triacs or thyristors such that the rate of switch-on in a leading edge dimmer and the rate of switch-off in a trailing edge dimmer is substantially instantaneous, typically 15–25 μs.

One of the known problems with dimmers, be they trailing or leading edge types, is that they may give rise to acoustic noise, and this noise is exacerbated when the dimmer is used in conjunction with a transformer, particularly magnetic transformers or electronic converters/transformers providing DC output. The noise may be at least partially caused by the vibration of the ferromagnetic laminates forming the core of the choke/s (in dimmer and transformer) and/or the vibration of certain capacitors. It is also known that the actual lamp filaments are caused to vibrate, and this is the case particularly with DC output electronic converters/-transformers, giving rise to an additional source of acoustic noise or hum. This noise/hum is disturbing and unpleasant and it is obviously desirable to reduce it as much as possible.

There exist both magnetic and electronic transformers on the market. Electronic transformers (or "converters") may be AC or DC (input and) output units. In the case of DC output transformers, a chopper is used to convert the DC voltage to a pulsating voltage, which may then be transformed to a different voltage, and ultimately rectified and smoothed. Regardless of the dimming technology used, there is always inherent noise associated with a dimmer/transformer combination that cannot be avoided, and the problem is particularly acute with DC output transformers.

Prior art approaches require additional components to be installed in the dimmer itself in order to reduce noise. Thus, in the case of leading-edge dimmers, the prior art uses a de-buzzing coil (choke), which is bulky, expensive, reduces efficiency and must be tuned to the dimmer circuitry. Coil selection can be a time-consuming task.

For trailing edge dimmers, designed for use with electronic transformers/-converters, the conventional noise reduction solution is to add a large capacitor for reducing the rate of decline of the trailing edge. When used in conjunction with an electronic transformer/converter, the capacitor may be placed before or after the diode bridge. However, if such a modified transformer is used with a leading edge dimmer, it actually increases the noise. Thus, known electronic lamp transformers/-converters employing a capacitor as explained above are intended for use with trailing edge dimmers only.

This means that it has not so far been possible to take a commercially available leading edge dimmer and use it in conjunction with a lamp transformer without avoiding noise, unless a "debuzzing coil" is selected and used. Conversely, common practice for noiseless dimming with the use of electronic transformers has been the use of electronic transformers incorporating a capacitor as described above, in conjunction with trailing edge dimmers.

JP 6089784 published Mar. 29, 1994 describes a low noise dimmer that attempts to reduce noise by smoothing a supply voltage waveform by controlling rise and fall curves of the lamp voltage. To this end, prior to the supply voltage crossing to zero from the negative half cycle, a forward power switch element is turned on, and an output voltage is detected. When an effective voltage approaches a target value, a microcomputer enters a fall motion and gradually lowers the output voltage within a predetermined time to the zero line smoothly. Also, for the negative side voltage, a reverse side power switch element and the microcomputer perform the same operation so that a rise motion is smooth. Thereby, hum noise production is prevented without applying an electromagnetic surge to an incandescent lamp.

This patent appears to relate to the known problem of switching a triac or thyristor during zero crossing of the AC voltage, since triacs are known to stop conducting when the current is zero and require a trigger signal to initiate conduction, such conduction being possible only if the anode voltage of the triac is larger than the cathode voltage thereof. Therefore, two switching devices are employed and are controlled to conduct during opposite halves of the AC cycle. The switching between the two thyristors itself causes noise and JP 6089784 appears to relate to a smoother mechanism for effecting the required switching so as to reduce the acoustic noise.

U.S. Pat. No. 5,319,301 issued Jun. 7, 1994 to Callahan M. et al. discloses an inductor-less light dimmer with semiconductor power devices coupled between an alternating current supply and a lamp load. Undesirable effects of the high current demands of cold lamp filaments are reduced by initially increasing the conductive portion of half-cycles, relative to the proportion required to produce the desired amount of average power, while avoiding transitions at phase angles that would produce excessive losses. A transition shape may be employed in this mode and in normal operation that maximizes audible lamp noise suppression for a given level of thermal losses.

WO 91/06047 published May 2, 1991 to Bayview Technology Group, Inc. and entitled "Reverse phase control switching circuit and method without zero crossing detection" discloses a method and circuit, in a dimmer, for reverse phase control of alternating current being delivered to a load wherein voltage-controlled semiconductor switches such as MOSFET's and IGBT's are used as electronic switches to conduct voltage during the leading edge of the AC voltage cycle and conduction is terminated when the desired phase angle of the current flow has been reached. The disclosed method and circuit eliminate the need for zero crossing detection of the AC waveform and ensure that the voltage-controlled switches are always turned on before the zero crossing thereby minimizing radiated interference and incandescent lamp hum.

Both U.S. Pat. No. 5,319,301 and WO 91/06047 appear to relate to leading edge dimmers only, to a noise solution inside the dimmer itself only, and appear only to address problems associated with switching at zero crossing of the AC voltage so as to reduce lamp hum.

It would therefore be desirable to provide a universal electronic lamp transformer that may be used with any commercially available dimmer, be it a leading edge or a trailing edge type, without requiring modification to the dimmer or the addition of external components in order to reduce noise, and also to provide a module, with the same dimming noise reduction effect, that may be added to conventional magnetic transformers.

SUMMARY OF THE INVENTION

It is an object of the invention to provide a lamp transformer (or standalone module) and method that are suitable for use with both leading and trailing edge dimmers so as to reduce lamp hum.

According to one aspect of the invention, there is provided a method for reducing acoustic noise produced during use of a dimmer, the method comprising:

(a) detecting that a dimmer is present, and if so:
   i) detecting whether the dimmer is a leading edge dimmer or a trailing edge dimmer,
   ii) if the dimmer is a leading edge dimmer, reducing the rate of rise of the leading edge, and
   iii) if the dimmer is a trailing edge dimmer, reducing the rate of fall of the trailing edge.

According to a further aspect of the invention, there is provided a controller for reducing acoustic noise produced during use of a leading edge dimmer, the controller comprising:

a leading edge controller responsive to an input voltage fed thereto for producing a control signal upon detection of a leading edge, and a linear switch coupled to the leading edge controller and responsive to the control signal for linearly switching the input voltage so that a rate of rise of the leading edge is decreased.

Preferably, such a controller is adapted for reducing acoustic noise produced during use of a trailing edge electronic dimmer, and further comprises:

a leading-trailing edge detector responsive to an input voltage fed thereto for detecting whether the input voltage results from a leading edge dimmer or a trailing edge dimmer, and a trailing edge controller coupled to the leading-trailing edge detector and responsive to detection of a trailing edge dimmer for disabling the leading edge controller and decreasing a rate of decline of the trailing edge of the input voltage;

said leading edge controller being coupled to the leading-trailing edge detector and responsive to detection of a leading edge dimmer for disabling the trailing edge controller.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4 is a block diagram showing a modified lamp transformer in accordance with a first embodiment of the invention for reducing noise in a leading edge dimmer;

FIGS. 5a, 5b, 5c, 5d and 5e show voltage waveforms corresponding to those of FIGS. 2 and 3 for the lamp transformer shown in FIG. 4;

FIGS. 10a, 10b and 10c show typical voltage waveforms associated with the lamp transformer according to the invention when used with a leading edge dimmer.

DETAILED DESCRIPTION OF THE INVENTION

Figures 1, 2A, 2D, 3A, 3D:
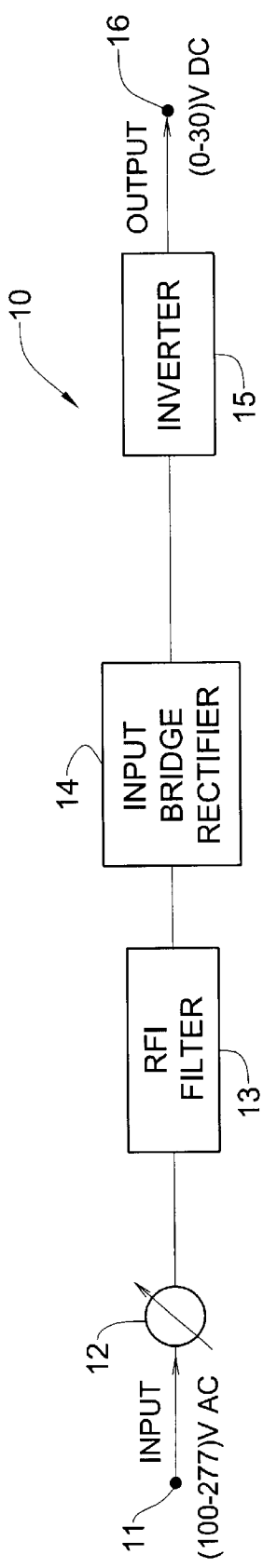
FIG. 1 is a block diagram showing a conventional prior art lamp transformer.
FIGS. 2a, 2b, 2c and 2d show graphically typical voltage waveforms appearing at different stages in a conventional prior art lamp transformer using a leading edge dimmer.
FIGS. 3a, 3b, 3c and 3d show corresponding voltage waveforms when a trailing edge dimmer is used.

FIG. 1 is a block diagram showing a conventional prior art DC output lamp transformer 10 comprising an input 11 for coupling to a mains electricity supply, typically 120 or 230 VAC. Connected to the input 11 is a dimmer 12 for reducing the RMS voltage. The dimmer 12 may be a leading edge or a trailing edge dimmer whose output is connected to an RFI filter 13 coupled to a bridge rectifier 14, producing a rectified AC voltage that is fed to an inverter 15. The inverter 15 includes an output transformer and optionally also a rectifier for rectifying the output voltage. Neither of these components is shown in the figure. The output of the inverter is thus AC (or DC) voltage typically in the range 0–30 V, suitable for powering low voltage tungsten halogen lamps and the like.

Figure 2B:
Figure 2C:
Figure 3B:
Figure 3C:

FIG. 2a shows graphically the sinusoidal input voltage waveform. FIG. 2b shows graphically the voltage appearing at the output of the dimmer 12 when a leading edge dimmer is used, it being noted that the leading edges in both positive and negative half cycles are chopped. FIG. 2c shows graphically the voltage appearing at the output of the bridge rectifier 14 and FIG. 2d shows graphically the voltage appearing at the output of the inverter 15. FIGS. 3a, 3b, 3c and 3d show corresponding voltage waveforms when the dimmer 12 is a trailing edge dimmer.

FIG. 4 is a block diagram showing a modified lamp transformer 20 in accordance with a first embodiment of the invention for reducing noise in a leading edge dimmer. An input 21 is coupled to a mains electricity supply, typically 120 or 230 VAC. Connected to the input 21 is a leading edge dimmer 22 whose output is connected to an RFI filter 23. The RFI filter 23 is connected to a bridge rectifier 24, producing a rectified AC voltage that is fed via a leading edge controller 25 to a linear switch 26 connected to an inverter 27. The output of the inverter is a DC voltage typically in the range 0–30 V DC, suitable for powering low voltage tungsten halogen lamps and the like.

FIG. 5a shows graphically the sinusoidal input voltage waveform. FIG. 5b shows graphically the voltage appearing at the output of the dimmer 22. Again, it will be noted that the leading edges in both positive and negative half cycles are chopped. FIG. 5c shows graphically the voltage appearing at the output of the bridge rectifier 14. FIGS. 5d and 5e show graphically the voltages appearing at the output of the linear switch 26 and the inverter 27, respectively. In particular, it will noted from the output of the inverter 27 that the leading edge climbs much more slowly than that of the conventional transformer, as depicted by the waveform shown in FIG. 2d.

Figure 6:
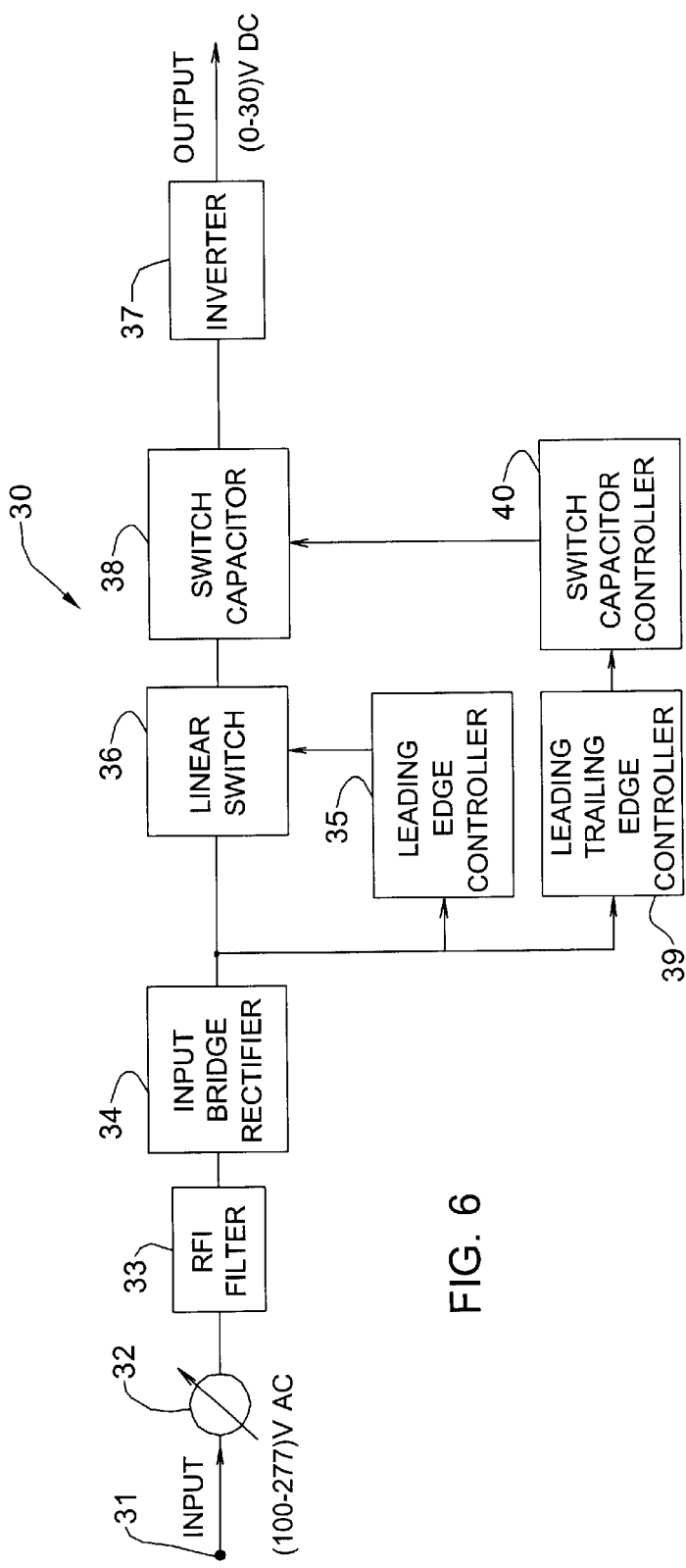
FIG. 6 is a block diagram showing a modified lamp transformer in accordance with a second embodiment of the invention for reducing noise in a leading or trailing edge dimmer.

FIG. 6 is a block diagram showing a modified lamp transformer 30 in accordance with a second embodiment of the invention for reducing noise in a leading or trailing edge dimmer. An input 31 is coupled to a mains electricity supply, typically 110 or 220 VAC. Connected to the input 31 is a dimmer 32 whose output is connected to an RFI filter 33. The dimmer 32 may be leading edge or a trailing edge device and, as will now be explained, suitable control circuitry is employed to control the leading edge and trailing edge, as required. The RFI filter 33 is connected to a bridge rectifier 34, producing a rectified AC voltage that is fed via a leading edge controller 35 to a linear switch 36 connected to an inverter 37 via a switch capacitor 38. The output of the inverter is a DC voltage typically in the range 0–30 V DC, suitable for powering low-voltage tungsten halogen lamps and the like. The output of the bridge rectifier 34 is also coupled via a leading-trailing edge detector 39 to a switch capacitor controller 40.

The leading edge controller 35 is responsive to a leading edge being detected by the edge detector 39 for operating in conjunction with the linear switch 36 as shown in FIG. 4 for slowing down the rate of rise of the leading edge as shown in the voltage waveforms depicted in FIGS. 5d and 5e. When the edge detector 39 detects a trailing edge, the switch capacitor controller 40 operates in conjunction with the switch capacitor 38 for slowing down the rate of decline of the trailing edge.

Figure 7A:
FIGS. 7a, 7b, 7c, 7d and 7e show voltage waveforms corresponding to those of FIG. 5 for the lamp transformer shown in FIG. 6.
Figures 7B, 7C, 7D, 7E:

FIG. 7a shows graphically the sinusoidal input voltage waveform. FIG. 7b shows graphically the voltage appearing at the output of the dimmer 32. Again, it will be noted that the leading edges in both positive and negative half cycles are chopped. FIG. 7c shows graphically the voltage appearing at the output of the bridge rectifier 14. FIGS. 7d and 7e show graphically the voltages appearing at the output of the linear switch 36 and the inverter 37, respectively. In particular, it will noted from the output of the inverter 37 that the trailing edge declines much more slowly than that of the conventional transformer, as depicted by the waveform shown in FIG. 3d.

Figure 8:
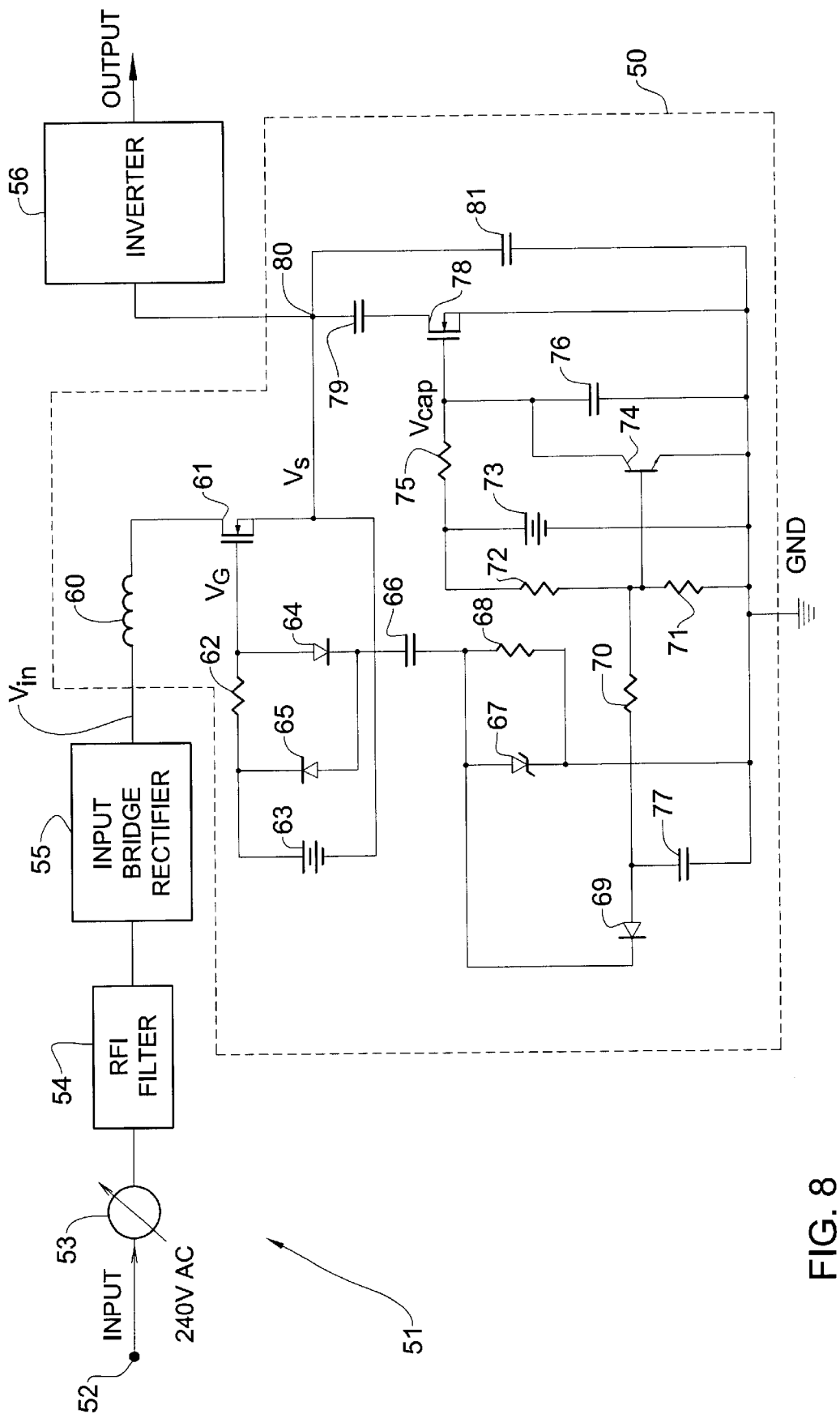
FIG. 8 is a schematic circuit diagram of a leading/trailer edge controller that may be incorporated in a conventional prior art lamp transformer for reducing noise.

FIG. 8 is a schematic circuit diagram of a leading/trailer edge controller 50 that may be incorporated in a conventional prior art lamp transformer 51 for reducing noise. Thus, the lamp transformer 51 comprises an input 52 for coupling to a mains electricity supply, typically 120 or 230 VAC. Connected to the input 52 is a dimmer 53 for reducing the average voltage. The dimmer 53 may be a leading edge or a trailing edge dimmer whose output is connected to an RFI filter 54 coupled to a bridge rectifier 55, producing a rectified AC voltage that is fed to an inverter 56 via the controller 50. The output of the inverter 56 is a DC voltage typically in the range 0–30 V DC, suitable for powering low-voltage tungsten halogen lamps and the like.

The controller 50 comprises an inductor (choke) 60 connected at one end to the output of the bridge rectifier 55 and connected at its opposite end to the drain of a first N-channel-type MOSFET 61 whose gate is connected via a resistor 62 to the positive terminal of a DC voltage source 63. The junction of the gate of the MOSFET 61 and the resistor 62 is connected to the anode of a first rectifier diode 64 whose cathode is connected to the anode of a second rectifier diode 65 whose cathode is connected to the positive terminal of the DC voltage source 63. The junction between the rectifier diodes 64 and 65 is connected to a first end of a capacitor 66 whose second end is connected to the anode of a zener diode 67 in parallel with a resistor 68. The cathode of the zener diode 67 is connected to GND. The second end of the capacitor 66 is also connected to the cathode of a rectifier diode 69 whose anode is connected via a resistor 70 to the input of a voltage divider comprising a first resistor 71 coupled to GND and a second resistor 72, and across which is connected a DC voltage source 73 whose negative terminal is connected to GND. The junction of the voltage divider resistors 71 and 72 is connected to the base of an NPN bipolar junction transistor 74 whose emitter is connected to GND and whose collector is connected via a resistor 75 to the positive terminal of the DC voltage source 73. A decoupling capacitor 76 is connected between the collector and the emitter of the bipolar junction transistor 74.

The junction between the anode of the rectifier diode 69 and the resistor 70 is connected via a capacitor 77 to GND. The collector of the bipolar junction transistor 74 is connected to the gate of a second N-channel-type MOSFET 78 whose source is connected to GND and whose drain is connected to a first end of a capacitor 79 (corresponding to the switch capacitor 38 in FIG. 6) whose second end is connected to the source of the first N-channel-type MOSFET 61 and constitutes also an output 80 of the controller 50 that is connected to the inverter 56. A capacitor 81 is connected across the output 80 and GND.

Operation of the circuit is as follows. When a leading edge dimmer is detected, the MOSFET 61, resistor 62, voltage source 63, rectifier diode 64 and capacitor 66 function as the linear switch 36 (in FIG. 6). Whenever there is a positive change in the output voltage of the dimmer, the linear switch brings the output voltage linearly up to its peak value in about 500 μsec. The MOSFET 61 operates as a voltage follower and the voltage source 63 follows the gate voltage of the MOSFET 61, which changes linearly since a constant current flows through the resistor 62 and the rectifier diode 64 for charging the capacitor 66, thus forcing the voltage across the capacitor 66 to rise linearly. The current magnitude is determined by the values of the resistor 62, the voltage source 63 and the threshold voltage of the MOSFET 61. The rectifier diode 65 serves to discharge the capacitor 66 at the end of each cycle.

The resistor 68, rectifier diode 69 and capacitor 77 function as the trailing edge detector 39 (in FIG. 8). The voltage across the capacitor 77 is proportional to the negative slope of the dimmer: the higher the slope, the higher is the magnitude of the negative voltage. The resistors 70, 71, 72 and 75, the bipolar junction transistor 74, the capacitor 76, the MOSFET 78 and the DC voltage source 73 serve as a controller to the switch capacitor 79. When the voltage across the capacitor 77 is sufficiently negative, the bipolar junction transistor 74 cuts off and the MOSFET 78 starts to conduct. When no dimmer is present, the MOSFET 78 is cutoff. The MOSFET 78 thus serves as a switch capacitor control switch for switching the switch capacitor 79 on and off. When the switch capacitor 79 is switched on, the negative slope is decreased since the discharge time is longer.

In an actual embodiment of the controller reduced to practice, values and types of the components were as follows:

| Component | Type/Value |
|---|---|
| 60 | 2 mH |
| 61 | IRF740 |
| 62 | 2 kΩ |
| 63 | 15 VDC |
| 64, 65 | D1N4148 |
| 66 | 6 nF |
| 67 | D1N750 |
| 68 | 10 kΩ |
| 69 | D1N4148 |
| 70, 72 | 300 kΩ |
| 71 | 33 kΩ |
| 73 | 10 VDC |
| 74, 76, 77, 79 | 1 µF |
| 75 | 100 kΩ |
| 78 | IRF470 |
| 81 | 220 nF |

Figure 9A:
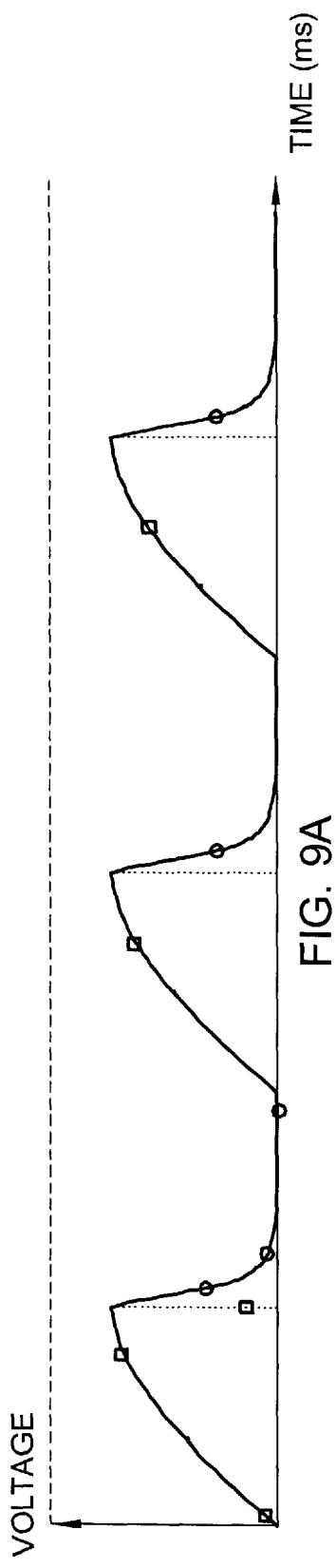
FIGS. 9a, 9b and 9c show typical voltage waveforms associated with the lamp transformer according to the invention when used with a trailing edge dimmer.
Figure 9B:
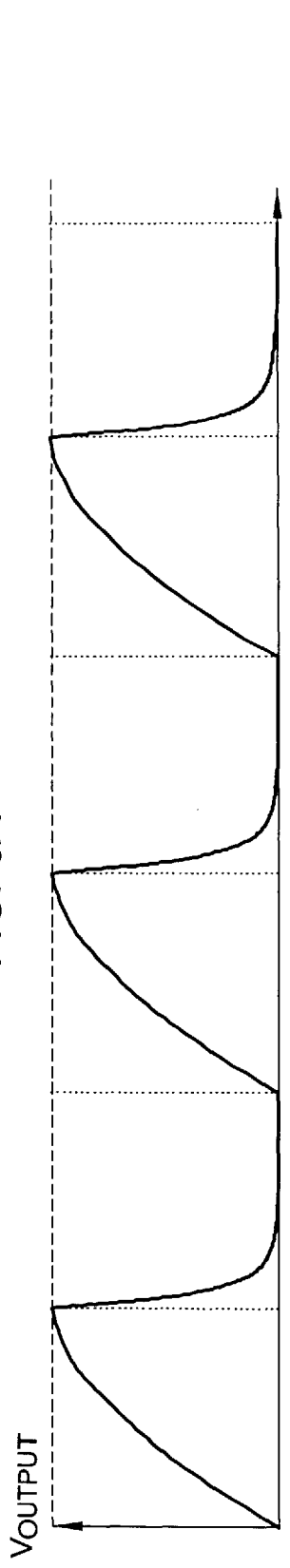
Figure 9C:
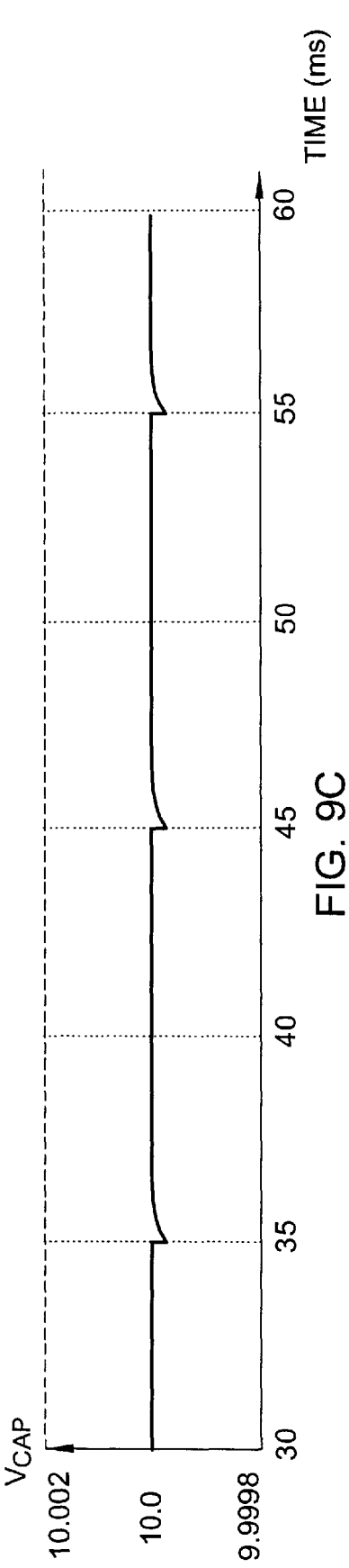

FIGS. 9a, 9b and 9c depict typical voltage waveforms associated with the lamp transformer according to the invention when used with a trailing edge dimmer. FIG. 9a shows the voltages at the input to the controller 50, referenced $V_{IN}$ in FIG. 8 and the source voltage of the MOSFET 61, referenced $V_S$ in FIG. 8. Thus, it is seen that where the input voltage falls abruptly, the source voltage of the MOSFET 61 declines much less sharply, taking about 500 µs before reaching zero.

FIG. 9b shows the output voltage of the inverter 56 and follows the source voltage of the MOSFET 61.

FIG. 9c depicts the voltage $V_{CAP}$ across the switch capacitor 79 when the MOSFET 78 is conducting, which it does only when a trailing edge dimmer is detected. When either no dimmer or a leading edge dimmer is detected, the MOSFET 78 is "OFF" and the switch capacitor 79 is disconnected.

FIGS. 10a, 10b and 10c depict typical voltage waveforms associated with the lamp transformer according to the invention when used with a leading edge dimmer. FIG. 10a shows the voltages at the input to the controller 50, referenced $V_{IN}$ in FIG. 8 and the source voltage of the MOSFET 61, referenced $V_S$ in FIG. 8. Thus, it is seen that where the input voltage climbs abruptly, the source voltage of the MOSFET 61 climbs much less sharply, taking about 500 µs before reaching its maximum value.

FIG. 10b shows the output voltage of the inverter 56 and follows the source voltage of the MOSFET 61.

FIG. 10c depicts the difference between the gate voltage $V_G$ and the source voltage $V_S$ of the MOSFET 61 when a leading edge dimmer is detected. $V_G$–$V_S$ remains constant until the leading edge is detected, whereupon it falls to the threshold voltage $V_T$ of the MOSFET (typically about 3.5V). This corresponds to the linear region of the MOSFET, which thus operates as a linear switch as explained above.

It will be appreciated that the circuit described above and the specimen and component values as tabulated are by way of illustration only and are not intended to limit the scope of the attached claims.

It will also be appreciated that while the invention has been described with particular reference to a controller that may be used with any off-the-shelf electronic transformer as described, the invention also contemplates within its scope an electronic transformer having the controller integral therewith.

What is claimed is:

1. A method for reducing acoustic noise produced during use of a lamp dimmer, the method comprising:
    (a) detecting that a dimmer is present, and if so:
        i) detecting whether the dimmer is a leading edge dimmer or a trailing edge dimmer,
        ii) if the dimmer is a leading edge dimmer, reducing the rate of rise of the leading edge, and
        iii) if the dimmer is a trailing edge dimmer, reducing the rate of fall of the trailing edge.

2. The method according to claim 1 being carried out within an electronic transformer coupled to a lamp for reducing acoustic noise produced by a dimmer when present.

3. A controller for reducing acoustic noise produced during use of a leading edge dimmer, the controller comprising:
    a leading edge controller responsive to an input voltage fed thereto for producing a control signal upon detection of a leading edge, and
    a linear switch coupled to the leading edge controller and responsive to the control signal for linearly switching the input voltage so that a rate of rise of the leading edge is decreased.

4. The controller according to claim 3 being further adapted for reducing acoustic noise produced during use of a trailing edge dimmer, and further comprising:
    a leading-trailing edge detector responsive to an input voltage fed thereto for detecting whether the input voltage results from a leading edge dimmer or a trailing edge dimmer, and
    a trailing edge controller coupled to the leading-trailing edge detector and responsive to detection of a trailing edge dimmer for disabling the leading edge controller and decreasing a rate of decline of the trailing edge of the input voltage;
    said leading edge controller being coupled to the leading-trailing edge detector and responsive to detection of a leading edge dimmer for disabling the trailing edge controller.

5. The controller according to claim 3, wherein the linear switch comprises a MOSFET.

6. The controller according to claim 3, wherein the trailing edge controller comprises a switch capacitor control switch for coupling a switch capacitor to an output of the controller.

7. The controller according to claim 6, wherein the leading-trailing edge detector includes a trailing edge detector comprising a resistor, rectifier diode and capacitor whose voltage is proportional to the negative slope of the trailing edge.

8. The controller according to claim 7, wherein the trailing edge controller comprises:
    a DC voltage source for charging a capacitor coupled to the switch capacitor control switch, and
    a switch connected across the capacitor;
    whereby when the voltage of the trailing edge is sufficiently negative, the switch is open circuit and the voltage across the capacitor causes the switch capacitor control switch to conduct.

9. The controller according to claim 8, wherein the switch is a bipolar junction transistor.

10. The controller according to claim 6, wherein the switch capacitor control switch is a MOSFET.

11. The controller according to claim 3, being integral with an electronic transformer.

12. The controller according to claim 4, being integral with an electronic transformer.

13. An electronic transformer including a controller for reducing acoustic noise produced during use of a leading edge dimmer, the controller comprising:
   a leading edge controller responsive to an input voltage fed thereto for producing a control signal upon detection of a leading edge, and
   a linear switch coupled to the leading edge controller and responsive to the control signal for linearly switching the input voltage so that a rate of rise of the leading edge is decreased.

14. The electronic transformer according to claim 13, wherein the controller is further adapted for reducing acoustic noise produced during use of a trailing edge dimmer, and comprises:
   a leading-trailing edge detector responsive to an input voltage fed thereto for detecting whether the input voltage results from a leading edge dimmer or a trailing edge dimmer, and
   a trailing edge controller coupled to the leading-trailing edge detector and responsive to detection of a trailing edge dimmer for disabling the leading edge controller and decreasing a rate of decline of the trailing edge of the input voltage;
   said leading edge controller being coupled to the leading-trailing edge detector and responsive to detection of a leading edge dimmer for disabling the trailing edge controller.

15. The transformer according to claim 13, wherein the linear switch comprises a MOSFET.

16. The transformer according to claim 14, wherein the trailing edge controller comprises a switch capacitor control switch for coupling a switch capacitor to an output of the controller.

17. The transformer according to claim 14, wherein the leading-trailing edge detector includes a trailing edge detector comprising a resistor, rectifier diode and capacitor whose voltage is proportional to the negative slope of the trailing edge.

18. The transformer according to claim 14, wherein the trailing edge controller comprises:
   a DC voltage source for charging a capacitor coupled to the switch capacitor control switch, and
   a switch connected across the capacitor;
   whereby when the voltage of the trailing edge is sufficiently negative, the switch is open circuit and the voltage across the capacitor causes the switch capacitor control switch to conduct.

19. The transformer according to claim 18, wherein the switch is a bipolar junction transistor.

20. The transformer according to claim 16, wherein the switch capacitor control switch is a MOSFET.

* * * * *

UNITED STATES PATENT AND TRADEMARK OFFICE
CERTIFICATE OF CORRECTION

PATENT NO. : 6,713,974 B2
APPLICATION NO. : 10/277683
DATED : March 30, 2004
INVENTOR(S) : Patchornik et al.

It is certified that error appears in the above-identified patent and that said Letters Patent is hereby corrected as shown below:

1) On Title Page, col. 1 Item (30), in, Foreign Application Priority Data, insert -- Jan. 10, 2002 (IL) 147578--.

Signed and Sealed this

Twenty-second Day of August, 2006

JON W. DUDAS
*Director of the United States Patent and Trademark Office*